United States Patent
Pradhan

(10) Patent No.: US 12,197,931 B2
(45) Date of Patent: *Jan. 14, 2025

(54) DETERMINATIONS OF MODIFICATIONS IN OBJECTS HAVING NESTED CHILD OBJECTS

(71) Applicant: Microsoft Technology Licensing, LLC, Redmond, WA (US)

(72) Inventor: Sudhansu Sekhar Pradhan, Bangalore (IN)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/486,704

(22) Filed: Oct. 13, 2023

(65) Prior Publication Data
US 2024/0111553 A1  Apr. 4, 2024

Related U.S. Application Data

(63) Continuation of application No. 17/316,213, filed on May 10, 2021, now Pat. No. 11,822,940.

(51) Int. Cl.
| | | |
|---|---|---|
| *G06F 9/451* | (2018.01) | |
| *G06F 3/04817* | (2022.01) | |
| *G06F 3/04842* | (2022.01) | |
| *G06F 16/215* | (2019.01) | |
| *G06F 16/23* | (2019.01) | |

(Continued)

(52) U.S. Cl.
CPC .......... *G06F 9/451* (2018.02); *G06F 3/04817* (2013.01); *G06F 3/04842* (2013.01); *G06F 16/215* (2019.01); *G06F 16/2365* (2019.01); *G06F 16/289* (2019.01); *H04L 9/0643* (2013.01)

(58) Field of Classification Search
None
See application file for complete search history.

(56) References Cited

U.S. PATENT DOCUMENTS

| | | | | |
|---|---|---|---|---|
| 2003/0065662 | A1* | 4/2003 | Cosic | G06F 16/21 707/999.009 |
| 2004/0103174 | A1* | 5/2004 | Balducci | H04W 4/00 709/221 |

(Continued)

*Primary Examiner* — Irene Baker
(74) *Attorney, Agent, or Firm* — Mannava & Kang, P.C.

(57) ABSTRACT

According to examples, an apparatus may include a processor and a memory on which is stored instructions that may cause the processor to determine that information has been inputted into an object, the object including a child object nested within the object. The instructions may also cause the processor to generate a child-object hash value based on contents of the child object, generate a hash value for the object based on contents of the object, the contents of the object including the child-object hash value, and determine whether the generated hash value differs from a stored hash value, the stored hash value corresponding to contents of the object without the inputted information. The instructions may also cause the processor to, based on a determination that the generated hash value differs from the stored hash value, save the object including the child object nested within the object.

20 Claims, 4 Drawing Sheets

(51) Int. Cl.
*G06F 16/28* (2019.01)
*H04L 9/06* (2006.01)

(56) References Cited

U.S. PATENT DOCUMENTS

| | | | |
|---|---|---|---|
| 2004/0117486 A1* | 6/2004 | Bourne | H04L 63/12 709/228 |
| 2005/0102314 A1* | 5/2005 | Howard | G06F 16/284 707/999.102 |
| 2007/0050713 A1* | 3/2007 | Yoshioka | G06F 40/166 715/229 |
| 2010/0257149 A1* | 10/2010 | Cognigni | G06F 16/27 711/216 |
| 2014/0223278 A1* | 8/2014 | Gelman | G06F 40/194 715/229 |
| 2014/0359411 A1* | 12/2014 | Botta | G06F 40/197 715/205 |
| 2017/0142479 A1* | 5/2017 | Babbar | G06F 16/71 |
| 2017/0315979 A1* | 11/2017 | Boucher | G06F 40/18 |
| 2019/0236302 A1* | 8/2019 | Czerkowicz | H04L 9/3247 |
| 2019/0236316 A1* | 8/2019 | Watkins | H04L 9/3236 |

* cited by examiner

DETERMINATIONS OF MODIFICATIONS IN OBJECTS HAVING NESTED CHILD OBJECTS

PRIORITY

This application is a Continuation of commonly assigned and co-pending U.S. patent application Ser. No. 17/316,213, filed May 10, 2021, the disclosure of which is hereby incorporated by reference in its entirety.

BACKGROUND

Forms may be generated for display on computing devices, through which users may update information in the forms. The computing devices may store the forms including the updated information.

BRIEF DESCRIPTION OF THE DRAWINGS

Features of the present disclosure are illustrated by way of example and not limited in the following figure(s), in which like numerals indicate like elements, in which.

DETAILED DESCRIPTION

Figure 1:
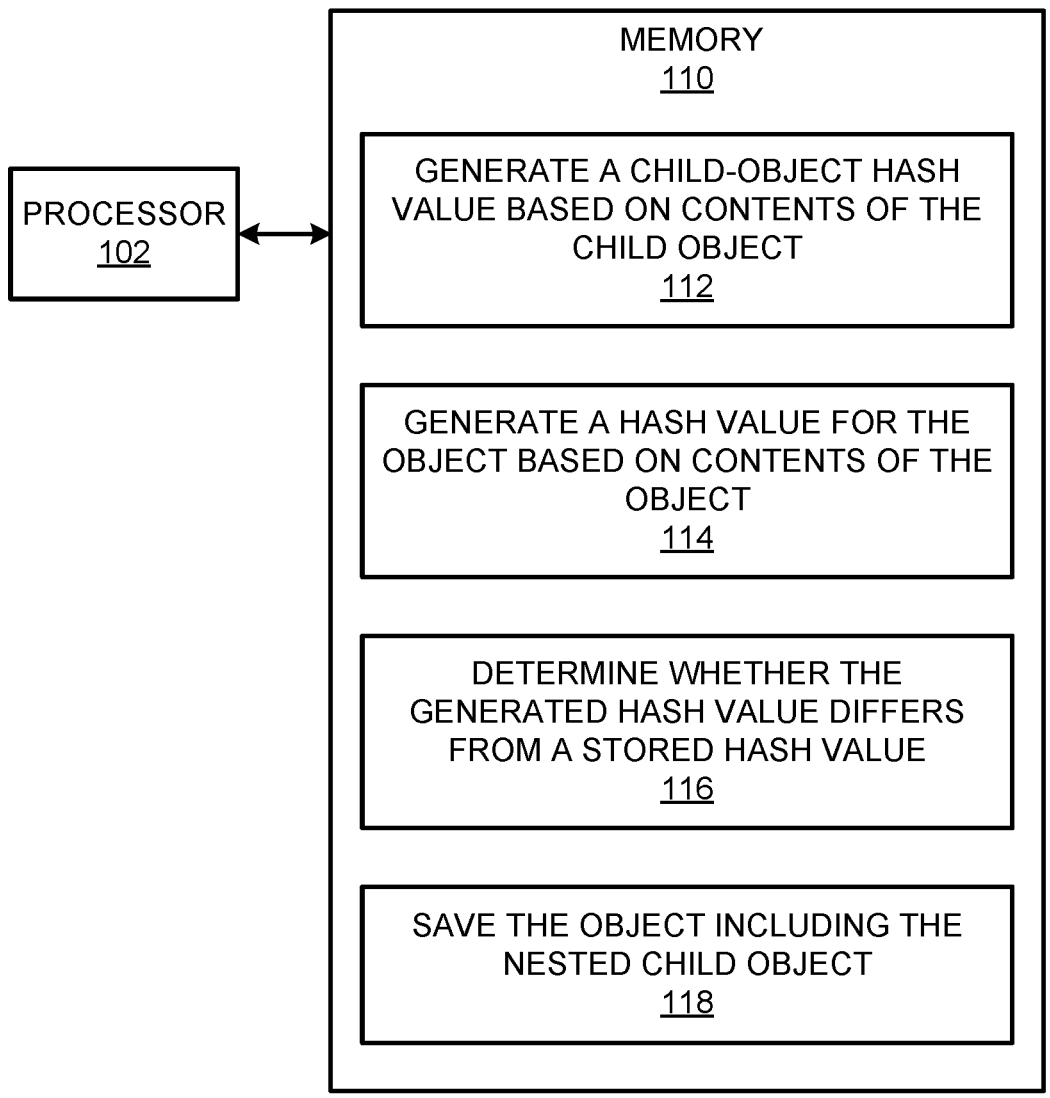
FIG. 1 depicts a block diagram of an apparatus that may determine whether an object may have been modified by comparing a generated hash value of the object with a stored hash value of the object, in which the object may include a nested child object, in accordance with an embodiment of the present disclosure.

For simplicity and illustrative purposes, the principles of the present disclosure are described by referring mainly to embodiments and examples thereof. In the following description, numerous specific details are set forth in order to provide an understanding of the embodiments and examples. It will be apparent, however, to one of ordinary skill in the art, that the embodiments and examples may be practiced without limitation to these specific details. In some instances, well known methods and/or structures have not been described in detail so as not to unnecessarily obscure the description of the embodiments and examples. Furthermore, the embodiments and examples may be used together in various combinations.

Throughout the present disclosure, the terms "a" and "an" are intended to denote at least one of a particular element. As used herein, the term "includes" means includes but not limited to, the term "including" means including but not limited to. The term "based on" means based at least in part on.

Generally, a computing device may be implemented to display objects, such as forms, data sets, spreadsheets, and/or the like, to a user. As changes are made in the objects, the computing device may enable the objects to be submitted and stored in a data store to preserve the changes. In some instances, the computing device may track whether the objects are modified, for instance to mark the objects as being "dirty," such that revised versions of the objects that include the newly added information may be submitted or saved.

In some instances, the objects may include child objects that are nested within the objects, e.g., embedded within user interfaces (UIs) of the objects. For instance, the objects may include a link or other feature that a user may use to access to the child forms that are nested within the objects. When a change is made to a child form without a change being made in the object, the computing device may not determine that the object has been modified and may thus not mark the object as being dirty and the modification to the child object nested within the object may not properly be saved.

Disclosed herein are apparatuses, systems, methods, and computer-readable media for determining when changes are made to information inputted in child objects that are nested within objects. As discussed herein, a child-object hash value may be generated based on information included in the child object. The child-object hash value may thus change when the information included in the child object changes. The child-object hash value may be included in the generation of a hash value of the object and thus, the hash value of the object may also change when the information in the child object changes. In some examples, the child-object hash value may be included in a field of the object and the hash value of the object may be generated based on content in the object including the child-object hash value included in the field of the object.

A processor may determine whether a change in the content of the object has been made, which may include a change in the content of the child object based on a comparison of the hash value of the object with a previously stored hash value. Based on a determination that the content in the object, which may include the content in the nested child object, has been modified, the processor may save the object and/or output an indication that the object has been modified. However, based on a determination that the content in the object, including the content in the child object, the processor may prevent storage or submission of the object.

Through implementation of the features of the present disclosure, a processor may efficiently and accurately determine when changes are made to objects having nested child objects. In addition, when the processor determines that a change has been made to an object, the processor may cause the object to be saved, which may preserve a current version of the object to be saved. As a result, the saved version of the object may be used as a current backup of the object.

Figure 2:
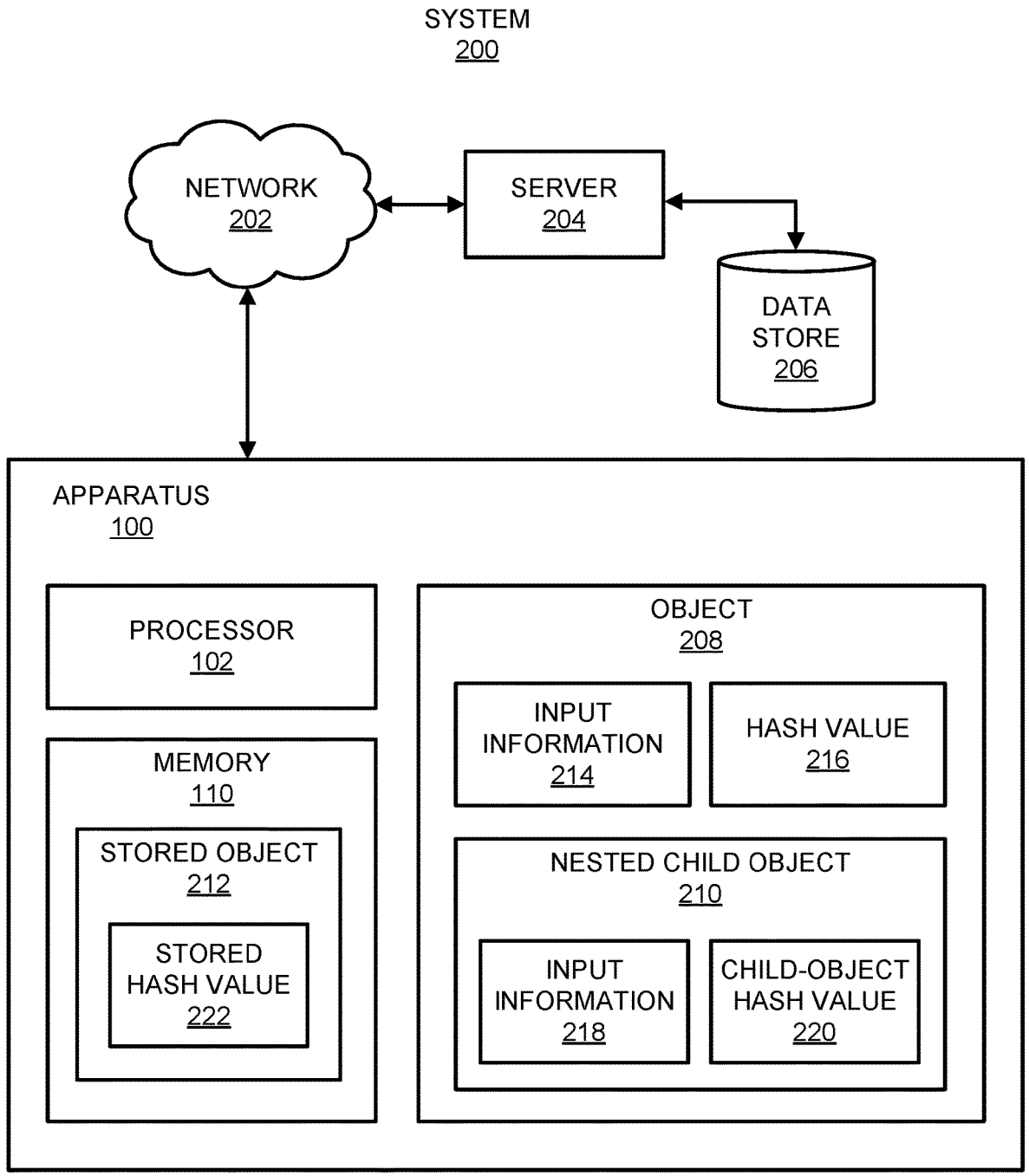
FIG. 2 shows a block diagram of a system within which the apparatus depicted in FIG. 1 may be implemented, in accordance with an embodiment of the present disclosure.

Reference is made to FIGS. 1 and 2. FIG. 1 shows a block diagram of an apparatus 100 that may determine whether an object may have been modified by comparing a generated hash value of the object with a stored hash value of the object, in which the object may include a child object that is nested within the object, in accordance with an embodiment of the present disclosure. FIG. 2 shows a block diagram of an example system 200 that may include the apparatus 100 depicted in FIG. 1, in accordance with an embodiment of the present disclosure. It should be understood that the apparatus 100 depicted in FIG. 1 and/or the system 200 depicted in FIG. 2 may include additional features and that some of the features described herein may be removed and/or modified without departing from the scopes of the apparatus 100 and/or the system 200.

The apparatus 100 may include a processor 102 and a memory 110. The apparatus 100 may be a computing device, including a desktop computer, a laptop computer, a tablet computer, a smartphone, an electronic device such as Internet of Things (IoT) device, a server, a node in a network (such as a data center), and/or the like. The processor 102 may include a semiconductor-based microprocessor, a central processing unit (CPU), an application-specific integrated circuit (ASIC), a field-programmable gate array (FPGA), and/or other hardware device. In some examples, the apparatus 100 may include multiple processors and/or cores without departing from a scope of the apparatus. In this regard, references to a single processor as well as to a single memory may be understood to additionally or alternatively pertain to multiple processors and multiple memories.

The memory 110 may be an electronic, magnetic, optical, or other physical storage device that contains or stores executable instructions. The memory 110 may be, for example, Read Only Memory (ROM), flash memory, solid state drive, Random Access memory (RAM), an Electrically Erasable Programmable Read-Only Memory (EEPROM), a storage device, an optical disc, or the like. The memory 110 may be a non-transitory computer-readable medium. The term "non-transitory" does not encompass transitory propagating signals.

As shown in FIG. 1, the processor 102 may execute instructions 112-118 to determine whether an object 208, e.g., a data set, a form, a spreadsheet, and/or the like, may have been modified by comparing hash values of versions of the object 208. The instructions 112-118 may be machine-readable instructions, e.g., non-transitory computer-readable instructions. In other examples, the apparatus 100 may include hardware logic blocks or a combination of instructions and hardware logic blocks to implement or execute functions corresponding to the instructions 112-118.

The apparatus 100 may be connected via a network 202, which may be the Internet, a local area network, and/or the like, to a server 204. In addition, a data store 206 may be connected to the server 204. The apparatus 100 may enable access to an object 208. According to examples, an object 208 may be defined as a data set, which may include input fields, to receive information to be included in the data set. In some examples, the object 208 may include a user interface (UI) to receive information for the data set.

In some examples, the object 208 may be include a child object 210 embedded within the object 208. For instance, access to the child object 210 may be made through selection of a feature provided in an input field of the object 208. The feature may include a link, a folder, an icon, and/or the like, such that selection of the feature may enable the child object 210 to be accessed, e.g., opened, displayed, and/or the like. The child object 210 may include a separate UI with a group of input fields associated with the child object 210. By way of particular example and for purposes of illustration, the object 208 may be a contact form to store contact information in an address book, which may include input fields to input a name, a phone number, and/or the like. In this example, the child object 210 may be an address form which may be stored in a particular input field of the contact form, and which may include its own UI with additional input fields to input address information such as a street, a city, a state, zip code, and/or the like.

The object 208 may correspond to a stored object 212, which may be a previously saved version of the object 208. In this regard, as changes are made to the object 208, the processor 102 may indicate the previously stored object 212 as being modified, or marked as "dirty," in order to save or submit the object 208 to replace the stored object 212. This may be done to preserve the changes made to the object 208, which may include changes made to the nested child object 210. In some examples, the processor 102 may store the object 212 in the memory 110 of the apparatus 100. Alternatively or additionally, the processor 102 may upload the object 208 to the server 204 to be stored in the data store 206.

The processor 102 may fetch, decode, and execute the instructions 112 to generate a child-object hash value 220 based on contents of the child object 210. In some examples, the processor 102 may generate the child-object hash value 220 based on all of the contents of the child object 210. For instance, the processor 102 may generate the child-object hash value 220 based on contents that may include information 218 inputted into the object 208. The processor 102 may generate the child-object hash value 220 periodically and/or based on a determination that the content in the child object 210 has been modified, e.g., content has been added, content has been deleted, content has been replaced, etc. In instances in which the content has been modified from a previous state, the child-object hash value 220 may differ from a previous version of the child-object hash value 220. However, in instances in which the content has not been modified, for instance, as may occur when a user deletes content and then undoes the deletion, the child-object hash value 220 may not change from a previous version of the child-object hash value 220.

The processor 102 may fetch, decode, and execute the instructions 116 to generate a hash value 216 for the object 208 based on contents of the object 208. The contents of the object may include the child-object hash value 220. The contents of the object may include input information 214 and other data stored in data fields of the object 208. In some examples, the hash value 216 may be a message authentication code (MAC), a key-hash message authentication code (HMAC), which may include a cryptographic hash function and a secret cryptographic key, and/or the like. The processor 102 may generate the hash value 216 based on all of the contents of the object 208. For instance, the processor 102 may generate the hash value 216 based on a payload that includes the input information 214 associated with all of the input fields within the object 208, including any newly added information.

In some examples, the processor 102 may determine that information has been inputted into the child object 210. For instance, the child object 210 may be implemented within a particular input field in the object 208. In these examples, the processor 102 may generate a child-object hash value 220 for the child object 210 based on a payload that includes the input information 218. The processor 102 may store the child-object hash value 220 in a first data field in the object 208 and a feature that may provide access to the child object 210 may be included in a second data field in the object 208. In some examples, the child-object hash value 220 may be stored in a hidden text field in the object 208. For instance, a hidden text field in the object 208 may be assigned to store the child-object hash value 220, and the processor 102 may store an HMAC for the child object 210 in the hidden text field in the object 208. As such, when generating the hash value 216 of the object 208, the processor 102 may use a payload that includes the child-object hash value 220 stored in the hidden text field in addition to other content included in the object 208.

The processor 102 may fetch, decode, and execute the instructions 116 to determine whether the generated hash value 216 differs from a stored hash value 222 associated with a previously stored object 212. The stored hash value 222 may correspond to, e.g., may be a hash value of, contents of the stored object 212, which may be a version of the object 208 without the input information 214 or input information 218 that may have been newly added. In other examples, and similarly, the processor 102 may determine whether the generated hash value 216 is equal to the stored hash value 222.

The processor 102 may fetch, decode, and execute the instructions 118 to, based on a determination that the generated hash value 216 differs from the stored hash value 222, save the object 208 including the child object 210 nested within the object 208. The processor 102 may submit the object 208, for example, to a server such as the server 204 depicted in FIG. 2, to be saved at the server. In some examples, the processor 102 may automatically save the object 208. Alternatively or additionally, the processor 102 may output an indication that the object 208 has been modified based on a determination that the generated hash value 216 differs from the stored hash value 222. For instance, in a case where the hash value 216 does not match the stored hash value 222, the processor 102 may identify the object 208 as being updated, and may mark the stored object 212 as being dirty.

In some examples, based on a determination that the object 208 is modified, the processor 102 may generate a message to inform a user that the object 208 includes modified input information 214 or 218 and to save the object 208. The processor 102 may activate or display a "submit" button to enable submission of or to save the object 208. In some examples, when the submit button is selected, the object 208 may be stored in a local data store (not shown) and/or uploaded to the data store 206 to replace the stored object 212. In some examples, the processor 102 may output an instruction that may prevent the object 208 from being closed or discarded prior to the object 208 being saved. Responsive to saving the object 208, e.g., by replacing the stored object 212, the processor 102 may output an instruction to save the generated hash value 216 to replace the stored hash value 222.

In some examples, based on a determination that the generated hash value 216 matches the stored hash value 222, the processor 102 may output an indication that the object 208 is not modified. This may occur even when a user modifies the object 208 as the user may modified the object 208 back to the previous state. In this regard, the processor 102 may output an instruction to prevent the object 208 from being saved, thereby preventing redundant copies from being saved or uploaded to the server 204.

Figure 3:
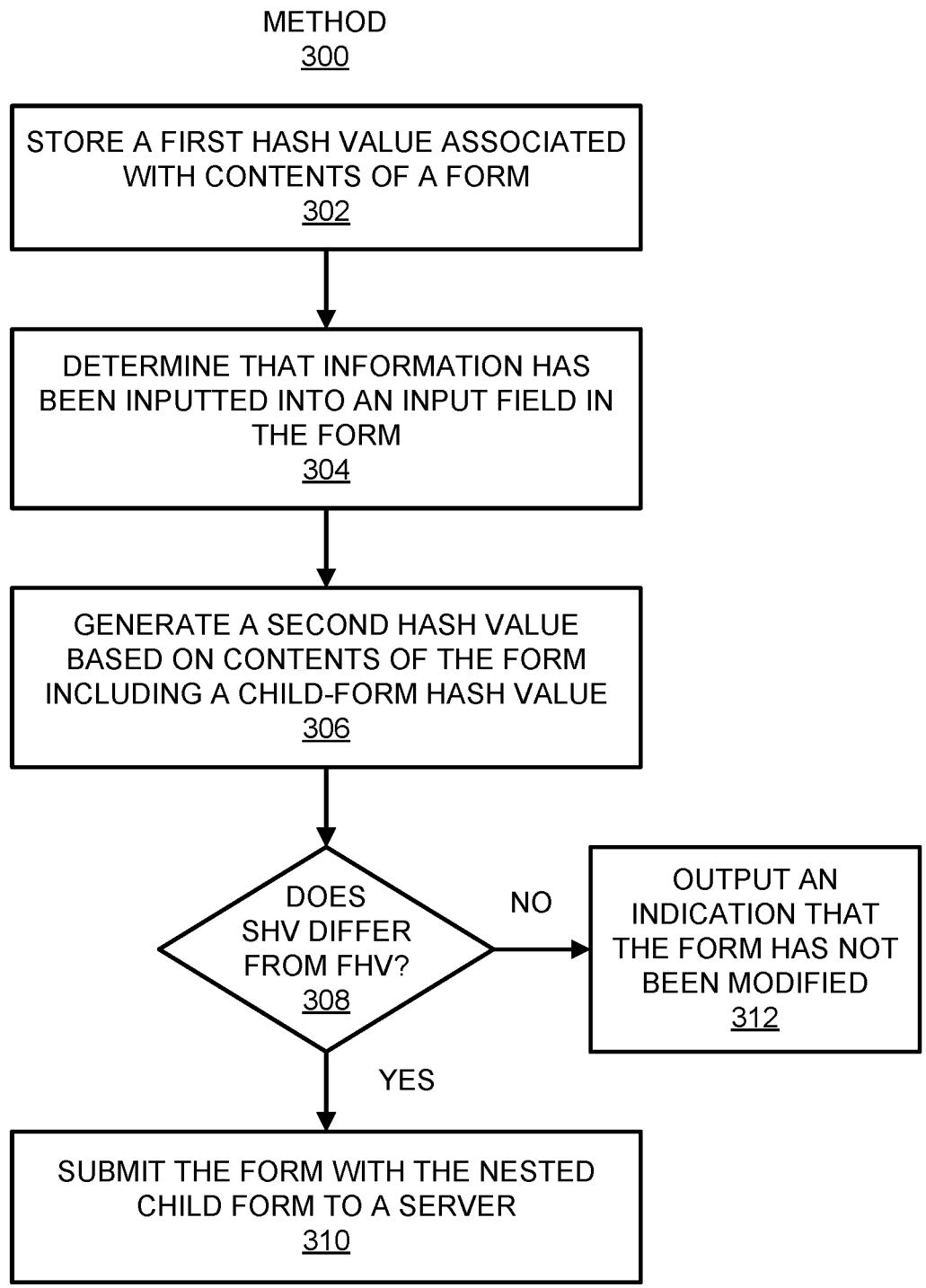
FIG. 3 shows a flow diagram of a method for determining that a form may have been modified by comparing a first hash value of a saved version of the form with a second hash value of a current version of the form, in which the form may include a nested child form, in accordance with an embodiment of the present disclosure.

Various manners in which a processor 102 implemented on the apparatus 100 may operate are discussed in greater detail with respect to the method 300 depicted in FIG. 3. FIG. 3 depicts a flow diagram of a method 300 for determining that a form, such as the object 208 depicted in FIG. 2, may have been modified by comparing a first hash value of a saved version of the form with a second hash value of a current version of the form, in which the form may include a nested child form, in accordance with an embodiment of the present disclosure. It should be understood that the method 300 depicted in FIG. 3 may include additional operations and that some of the operations described therein may be removed and/or modified without departing from the scope of the method 300. The description of the method 300 is made with reference to the features depicted in FIGS. 1 and 2 for purposes of illustration.

At block 302, the processor 102 may store a first hash value associated with contents of a form, e.g., object 208, such as the stored hash value 222 depicted in FIG. 2. The first hash value 222 may correspond to a saved version of the form, such as the stored object 212 depicted in FIG. 2.

At block 304, the processor 102 may determine that input information 214, 218 has been inputted into an input field in the form 208. At block 306, based on a determination that the information 214, 218 has been inputted into the form 208, the processor 102 may generate a second hash value, such as the hash value 216, based on contents of the form 208. In some examples, the contents of the form may include the input information 214. The contents of the form 208 may include a child-object hash value 220, that may be based on contents of the child form 210.

At block 308, the processor 102 may determine whether the first hash value (FHV) 222 differs from the second hash value (SHV) 216. The second hash value may correspond to a current, e.g., an unsaved, version of the form 208.

At block 310, based on a determination that the second hash value 216 differs from the first hash value 222, the processor 102 may submit the form 208, including the child form 210, to a server, such as the server 204 depicted in FIG. 2, to be saved at the server. In some examples, the processor 102 may automatically save the form 208. Alternatively or additionally, the processor 102 may output an indication that the form 208 has been modified. However, at block 312, based on a determination that the second hash value 216 does not differ from the first hash value 222, the processor 102 may output an indication that the form 208 has not been modified. In other examples, instead of outputting the indication that the form 208 is not modified based on a determination that the second hash value matches the first hash value, the processor 102 may not output any indication.

In some examples, the form 208 may include a nested child form 210. The child form 210 may be disposed in an input field within the form 208 and may include its own set of input fields, child forms, and/or the like. In these examples, the processor 102 may determine that the detected input to the form 208 is input information 218 in the child form 210. The processor 102 may also generate a child-object hash value 220 for the child form 210 including the input information 218 in the child form 210.

The processor 102 may generate the second hash value 216 based on the contents of the form 208. In this regard, the payload that includes contents of the form 208 used for generating the second hash value 216 may include the child-object hash value 220. In some examples, the processor 102 may generate the second hash value 216 as a HMAC and may store the HMAC in a hidden text field in the form 208.

Based on a determination that the second hash value 216 matches the first hash value 222, the processor 102 may output a message to save the form 208, output an instruction to display a submit button to save the form 208, output an instruction to prevent discarding the form 208 without saving the form 208, output an instruction to save the second hash value to replace the first hash value responsive to saving the form 208, and/or the like.

Based on a determination that the second hash value 216 matches the first hash value 222, the processor 102 may output an indication that the form 208 is not modified, output an instruction to prevent the form 208 from being saved, and/or the like.

Some or all of the operations set forth in the method 300 may be included as utilities, programs, or subprograms, in any desired computer accessible medium. In addition, the method 300 may be embodied by computer programs, which may exist in a variety of forms both active and inactive. For example, they may exist as machine-readable instructions, including source code, object code, executable code or other formats. Any of the above may be embodied on a non-transitory computer-readable storage medium.

Examples of non-transitory computer-readable storage media include computer system RAM, ROM, EPROM, EEPROM, and magnetic or optical disks or tapes. It is therefore to be understood that any electronic device capable of executing the above-described functions may perform those functions enumerated above.

Figure 4:
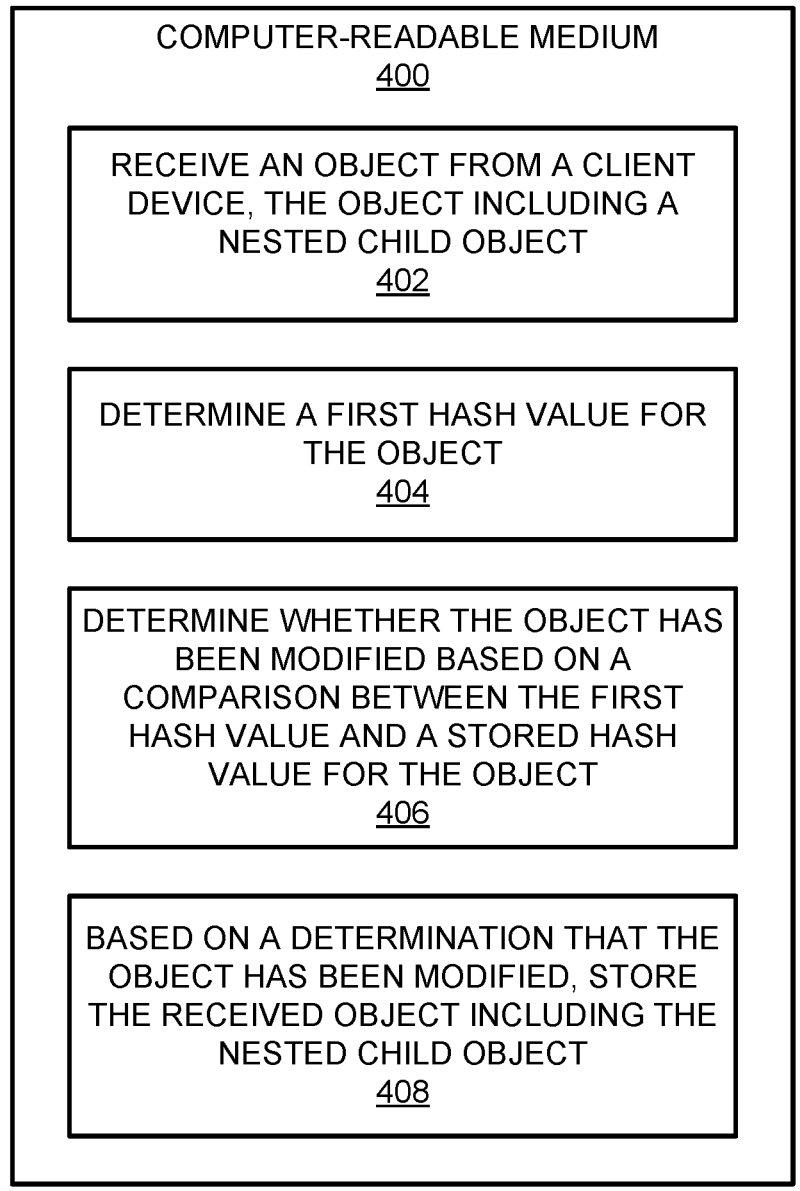
FIG. 4 depicts a block diagram of a computer-readable medium that may have stored thereon computer-readable instructions to determine whether an object having a child object that is nested within the object may have been modified by comparing a generated hash value of the object with a stored hash value of a stored object, in accordance with an embodiment of the present disclosure.

Turning now to FIG. 4, there is shown a block diagram of a computer-readable medium 400 that may have stored thereon computer-readable instructions to determine whether an object 208 having a child object 210 that is nested within the object 208 may have been modified by comparing a generated hash value 216 of the object 208 with a stored hash value 222 of a stored object 212, in accordance with an embodiment of the present disclosure. It should be understood that the computer-readable medium 400 depicted in FIG. 4 may include additional instructions and that some of the instructions described herein may be removed and/or modified without departing from the scope of the computer-readable medium 400 disclosed herein. The description of the computer-readable medium 400 is made with reference to the features depicted in FIGS. 1 and 2 for purposes of illustration. The computer-readable medium 400 may be a non-transitory computer-readable medium. The term "non-transitory" does not encompass transitory propagating signals.

The computer-readable medium 400 may have stored thereon machine-readable instructions 402-408 that a processor disposed in a server 204 may execute. The computer-readable medium 400 may be an electronic, magnetic, optical, or other physical storage device that contains or stores executable instructions. The computer-readable medium 400 may be, for example, Random Access memory (RAM), an Electrically Erasable Programmable Read-Only Memory (EEPROM), a storage device, an optical disc, and the like.

The processor may fetch, decode, and execute the instructions 402 to receive an object 208 from a client device. In some examples, the processor may be a processor at the server 204, and the client device may be the apparatus 100 as depicted in FIG. 2. In some examples, the child object 210 may be nested in a data field of the object 208.

The processor may fetch, decode, and execute the instructions 404 to determine a first hash value for the nested object 208. The first hash value may be the hash value 216 depicted in FIG. 2. The first hash value 216 may be based on information in the object 208 and a child-object hash value 220.

The processor may fetch, decode, and execute the instructions 406 to determine whether the object 208 has been modified based on a comparison between the first hash value 216 and a stored hash value 222 for the object 208. As discussed herein, the comparison of the hash values may be more efficient in both time and computing resources than a comparison of the object 208 to the stored copy of the object 212.

The processor may fetch, decode, and execute the instructions 408 to store the received object 208 including the child object 210 based on a determination that the object 208 has been modified. In some examples, based on a determination that the first hash value 216 for the received object 208 is the same as the hash value 222 for the stored copy of the object 212, the processor may determine that the received object 208 has not been modified, and may not store the received object 208.

In some examples, the processor may determine the child-object hash value 220 based on contents of data fields in the child object 210. The processor may determine whether the child object 210 has been modified based on the comparison of between the first hash value 216 for the object 208 and the stored hash value 222 for the stored object 212. For instance, since the first hash value 216 is generated based on information that includes the child-object hash value 220 for the child object 210, the first hash value 216 for the object 208 may be used to determine whether any changes in the object 208 has been made, including any changes to the child object 210.

In some examples, the first hash value 216 for the object 208 may be stored in a first data field in the object 208. The child-object hash value 220 for the child object 210 may be stored in a second data field in the object 208.

The first hash value 216 for the object 208 may be stored in a hidden text field in the object 208. The child-object hash value 220 for the child object 210 may be stored in a hidden text field in the object 208. The first hash value 216 for the object 208 and/or the child-object hash value 220 for the child object 210 may be a keyed-hash message authentication code (HMAC).

The processor may retrieve the first hash value 216 from a data field in the received object 208 and may retrieve the stored hash value 222 for the object 208 from a stored copy of the object 212. In some examples, based on the comparison between the first hash value 216 and the stored hash value 222, the processor may replace the stored copy of the object 212 with the received object 208.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration and are not meant as limitations. Many variations are possible within the scope of the disclosure, which is intended to be defined by the following claims—and their equivalents—in which all terms are meant in their broadest reasonable sense unless otherwise indicated.

What is claimed is:

1. An apparatus comprising:
a processor; and
a memory on which is stored machine-readable instructions that when executed by the processor, cause the processor to:
storing a hash value for a parent form;
generate a child-form hash value based on contents of a child form, wherein the child-form hash value is stored in a first input field among a plurality of input fields in the parent form;
generate a parent-form hash value for the parent form based on contents of the parent form, the contents of the parent form including the child-form hash value stored in the first input field of the parent form;
determine whether the generated parent-form hash value differs from the stored hash value;

based on a determination that the generated parent-form hash value differs from the stored hash value, mark the parent form as being dirty and output a message to save the parent form comprising the child form nested within the parent form; and based on an input in response to the output message to save the parent form, transmit the parent form including the child form to a server to be saved.

2. The apparatus of claim 1, wherein the instructions cause the processor to:

generate the parent-form hash value for the parent form as a keyed-hash message authentication code (HMAC); and store the HMAC in a hidden text field in the parent form.

3. The apparatus of claim 1, wherein, based on a determination that the generated parent-form hash value differs from the stored hash value, the instructions cause the processor to:

output an instruction to display a submit button to save the parent form;

output an instruction to prevent the parent form from being discarded without saving the parent form; or responsive to the parent form being saved, output an instruction to save the generated parent-form hash value as the stored hash value.

4. The apparatus of claim 1, wherein the instructions further cause the processor to:

based on a determination that the generated parent-form hash value matches the stored hash value, output an indication that the parent form is not modified.

5. The apparatus of claim 1, wherein the instructions further cause the processor to:

based on a determination that the generated parent-form hash value matches the stored hash value, output an instruction to prevent the parent form from being saved.

6. A method comprising:

storing, by a processor, a first hash value for a parent form, wherein the first hash value corresponds to a saved version of the parent form;

determining, by the processor, that information has been inputted into an input field in a child form nested within the parent form;

based on a determination that the information has been inputted into the child form, generating, by the processor, a second hash value based on contents of the child form, the second hash value being stored in a first input field among a plurality of input fields of the parent form;

generating, by the processor, a third hash value based on contents of the parent form, the contents of the parent form comprising the second hash value stored in the first input field of the parent form;

determining, by the processor, whether the third hash value differs from the first hash value, the third hash value corresponding to an unsaved version of the parent form; and based on a determination that the third hash value differs from the first hash value, marking, by the processor, the parent form as being dirty and transmitting, by the processor based on the parent form being marked dirty, the parent form with the nested child form to a server to be saved.

7. The method of claim 6, further comprising:

based on an input to save the parent form in response to the parent form being marked dirty, transmitting the parent form with the nested child form to the server to be saved.

8. The method of claim 6, further comprising:

generating the first hash value as a keyed-hash message authentication code (HMAC); and storing the HMAC in a hidden text field in the parent form.

9. The method of claim 6, further comprising:

outputting a message to save the parent form;

outputting an instruction to display a submit button to save the parent form;

outputting an instruction to prevent the parent form from being discarded without saving the parent form; or responsive to the parent form being saved, outputting an instruction to save the third hash value to replace the first hash value.

10. The method of claim 6, further comprising:

based on the determination that the third hash value differs from the first hash value, outputting an indication to save the parent form on the server; and based on an input in response to the indication to save the parent form, transmitting the parent form with the nested child form to the server to be saved.

11. A computer-readable medium on which is stored computer-readable instructions that, when executed by a processor, cause the processor to:

receive a form from a client device, the received form having a plurality of input fields and a child form that is nested within the received form;

determine a first hash value for the received form, the first hash value being based on information in the received form and a child-form hash value that is generated based on information in the child form;

determine whether the received form has been modified based on a comparison between the first hash value and a stored hash value for the received form;

based on a determination that the received form has been modified, mark the received form as dirty; and based on the form being marked dirty, store the received form including the child form nested within the received form.

12. The computer-readable medium of claim 11, wherein the instructions cause the processor to:

store the first hash value for the received form in a first input field in the received form; and store the child-form hash value for the child form in a second data field in the received form.

13. The computer-readable medium of claim 11, wherein the instructions cause the processor to:

store the first hash value for the received form in a hidden text field in the received form, wherein the first hash value for the received form is a keyed-hash message authentication code (HMAC).

14. The computer-readable medium of claim 11, wherein the instructions cause the processor to:

retrieve the first hash value from an input field among the plurality of input fields in the received form;

retrieve the stored hash value for the received form from a stored copy of the received form; and based on the determination that the received form has been modified based on the comparison between the first hash value and the stored hash value, output a message at the client device indicating that the received form is dirty, the output message including a selectable object to save the received form; and based on a selection of the selectable object in the output message, replace the stored copy of the received form with the received form including the child form nested within the received form.

15. The apparatus of claim 1, wherein the first input field among the plurality of input fields of the parent form is a hidden text field.

16. The apparatus of claim 1, wherein the child form includes an input field, and the content of the child form, based on which the child-form hash value is generated, includes information input in the input field of the child form.

17. The apparatus of claim 16, wherein the information in the input field of the child form is modifiable.

18. The method of claim 6, wherein the first input field among the plurality of input fields of the parent form is a hidden text field.

19. The computer-readable medium of claim 12, wherein the first input field and the second input field in the received form are hidden text fields.

20. The method of claim 11, wherein the child form includes an input field, and the information in the child form, based on which the child-form hash value is generated, includes information input in the input field of the child form.

* * * * *